United States Patent [19]

Mazewski et al.

[11] Patent Number: 5,766,491
[45] Date of Patent: Jun. 16, 1998

[54] BACKFLOW PREVENTION SYSTEM FOR MEDIA BED REACTOR

[75] Inventors: Eugene Mazewski, Pewaukee; Peter J. Petit, Waukesha; Robert D. Hines, Jr., Kenosha, all of Wis.

[73] Assignee: Envirex Inc., Waukesha, Wis.

[21] Appl. No.: 656,705

[22] Filed: Jun. 3, 1996

Related U.S. Application Data

[63] Continuation of Ser. No. 236,422, Apr. 29, 1994, abandoned.

[51] Int. Cl.⁶ .................................................. B01D 24/40
[52] U.S. Cl. ............................................................ 210/807
[58] Field of Search ................................ 210/794, 795, 210/108, 137, 274, 275, 277–279, 289, 291, 293, 807

[56] References Cited

U.S. PATENT DOCUMENTS

| | | | |
|---|---|---|---|
| 3,879,287 | 4/1975 | Porter | 210/33 |
| 3,956,128 | 5/1976 | Turner | 210/150 |
| 4,094,790 | 6/1978 | Schmidt, Jr. | 210/289 |
| 4,098,695 | 7/1978 | Novotny | 210/85 |
| 4,170,626 | 10/1979 | Cutter et al. | 422/143 |
| 4,202,774 | 5/1980 | Kos | 210/274 |
| 4,322,299 | 3/1982 | Scholten et al. | 210/794 |
| 4,412,003 | 10/1983 | Evans | 210/275 |
| 4,464,262 | 8/1984 | Owens et al. | 210/291 |
| 4,469,599 | 9/1984 | Gros et al. | 210/610 |
| 5,068,034 | 11/1991 | Walter | 210/274 |

FOREIGN PATENT DOCUMENTS

| | | |
|---|---|---|
| A-0090450 | 10/1983 | European Pat. Off. |
| A-0145612 | 6/1985 | European Pat. Off. |
| A-2 588 772 | 4/1987 | France |
| A-3712166 | 10/1987 | Germany |

*Primary Examiner*—Ivars Cintins
*Attorney, Agent, or Firm*—Michael, Best & Friedrich

[57] ABSTRACT

The invention provides a fluid treatment apparatus including a fluid bed reactor. The fluid bed reactor includes a flow distribution system having a flow distributor for introducing untreated fluid into the reactor. The untreated fluid is introduced at a flow rate sufficient to generate an upflow velocity within the reactor that fluidizes the media bed within the reactor. The flow distribution system also includes a backflow prevention apparatus for supplying an auxiliary fluid to the flow distributor in the event flow of untreated fluid to the flow distributor is interrupted. The auxiliary fluid flushes the flow distributor while the media bed defluidizes to prevent the media bed from backing up into the flow distributor as it settles to the bottom of the reactor.

3 Claims, 2 Drawing Sheets

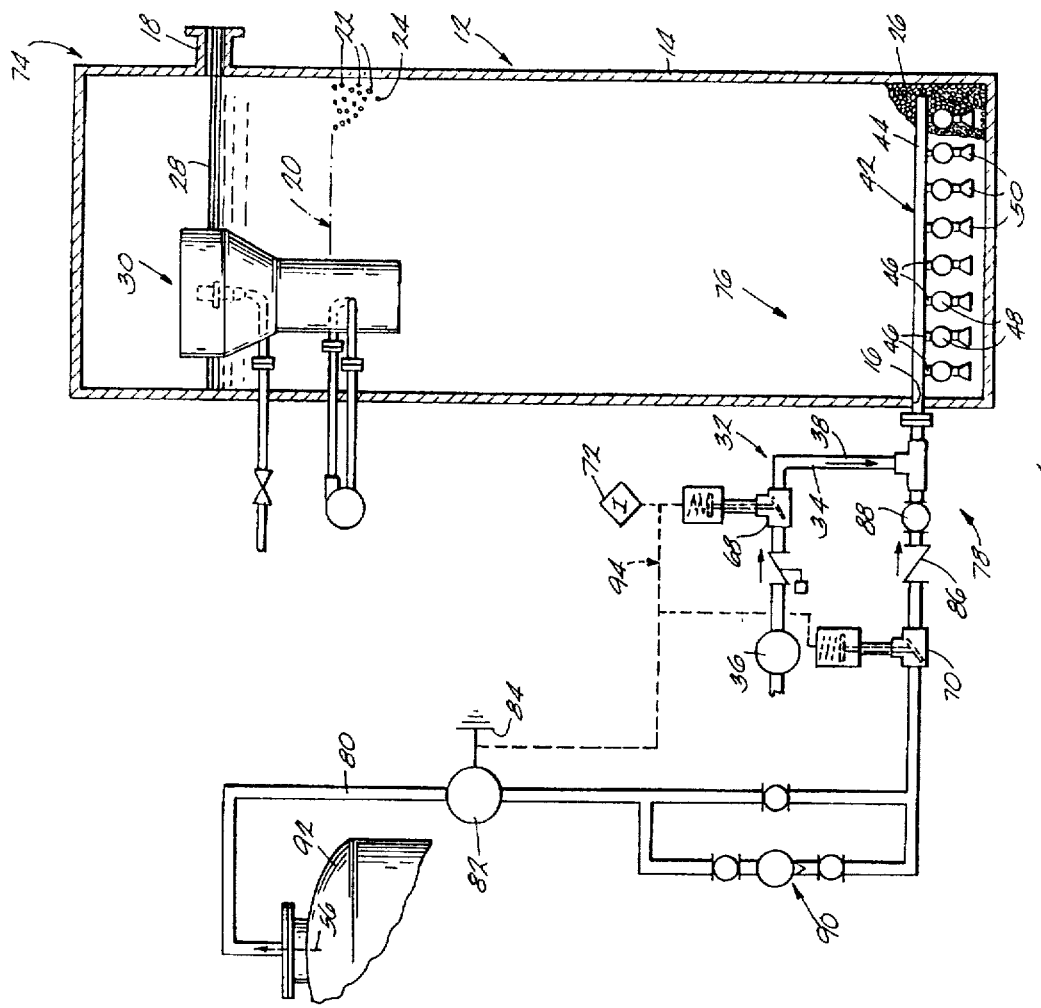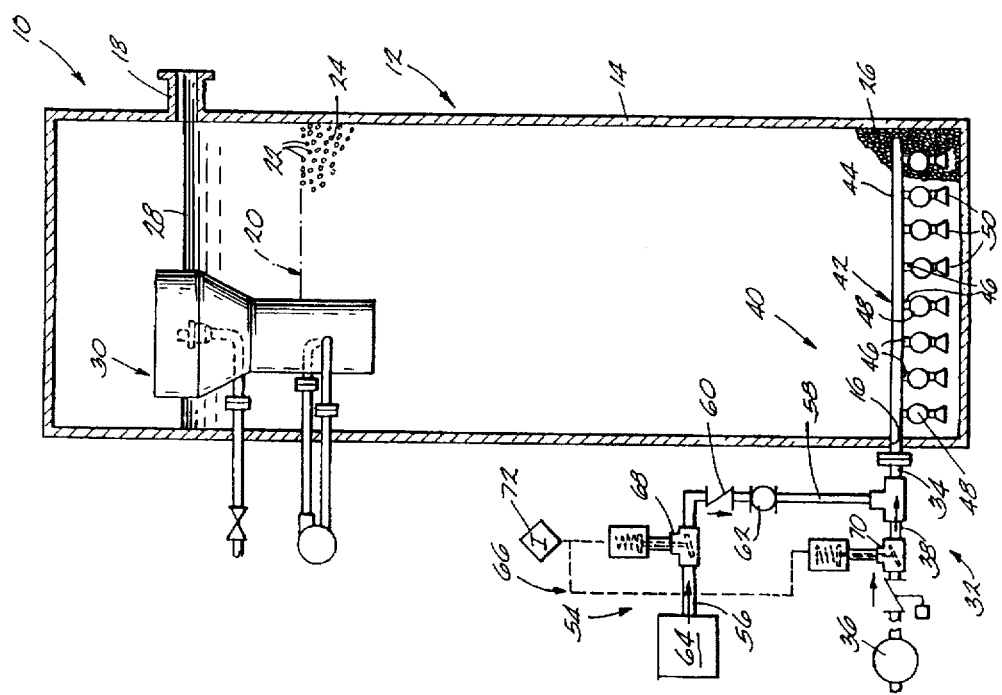

BACKFLOW PREVENTION SYSTEM FOR MEDIA BED REACTOR

This is a continuation of application Ser. No. 08/236,422, filed Apr. 29, 1994, now abandoned.

FIELD OF THE INVENTION

The invention relates generally to fluid treatment apparatus including vessels or reactors containing media beds for performing desired processing steps on fluids, and more particularly to manifolds or flow distribution systems for introducing fluent material into those vessels or reactors.

REFERENCE TO THE PRIOR ART

Reactors employing media beds are used in various fluid treatment applications. The media bed is typically comprised of particulate material, the make-up of which depends on the particular application. Examples of media bed materials include, sand, granular carbon and synthetic beads. Fluid treatment is accomplished by passing the fluid through the media bed so that desired processing steps are performed on the fluid. For instance, examples of such processing steps include the removal of unwanted impurities from a fluid, the release of desirable impurities in a fluid, ion exchange, and others; and these processing steps can be achieved biologically, chemically, through adsorption, or by other known means.

Reactors of the foregoing type each generally include a vessel or reactor tank which contains the media bed, and a manifold or flow distribution system for introducing fluent material into the reactor tank for contact with the media bed. The flow distribution system typically includes orifices or nozzles for dispersing the fluent material within the reactor tank. Examples of flow distributors used in various applications are provided in U.S. Pat. Nos. 4,464,262, 4,202,774, 4,170,626, 4,098,695, 4,094,790 and 3,879,287.

By way of example, in one application a fluid bed reactor is used to biologically remove impurities from waste water. The principals of operation of fluid bed biological reactors are provided in U.S. Pat. Nos. 4,182,675, 4,009,105, 4,009,099, 4,009,098, 3,956,129 and 3,846,289. Briefly, waste water is supplied to the reactor through a flow distributor positioned near the base of the reactor. The flow distributor includes a header communicating with the waste water inlet of the reactor tank, and the header is manifolded to a plurality of downcomer pipes that are connected to nozzle-studded lateral pipes. The waste water is introduced at a flow rate sufficient to create an upflow in the reactor that fluidizes the media bed which contains particulate solids (i.e., sand or granular carbon) and biological material (or biomass) supported on those solids. As the waste water passes through the media bed the biomass consumes the impurities therein. When the media bed is fluidized it provides a large surface area over which the biomass can interact with the waste water. The reactor effluent produced by the treatment accumulates in a freeboard area above the media bed and is subsequently withdrawn from the reactor for further treatment or disposal.

SUMMARY OF THE INVENTION

The invention provides a fluid treatment apparatus including a reactor and an improved flow distribution system for introducing influent into the reactor. The improved flow distribution system includes a system for flushing the flow distributor to prevent or at least minimize the back-up of media bed constituents into the flow distributor following reactor shut-down. The flushing system can be incorporated into new reactors or retrofitted to reactors already in service.

More particularly, when the fluid supply to a fluid bed reactor is interrupted, the media bed defluidizes and eventually settles in a quiescent state on the bottom of the reactor tank. Applicants have observed that while the media bed is settling it is possible for it to back up to some extent into the flow distributor. A sudden loss of fluid supply or back pressure in the flow distributor of a fixed bed reactor could also cause media bed constituents to be drawn into the flow distributor. When the reactor is returned to normal operation following the interruption, a loss of flow capacity can result if media bed back-up into the flow distributor is significant. Additionally, media bed constituents occupying the flow distributor can cause abrasion within the system. To restore lost reactor capacity and to remove abrasive media bed constituents from the flow distributor, the reactor must be temporarily removed from service while the flow distributor is taken apart and cleaned out. This, of course, results in equipment downtime and labor costs.

To alleviate the problems associated with media bed back-up into the flow distributor of a reactor following reactor shut-down, Applicants have developed a reliable, economical and automatically operable flushing system that operates to prevent such back-ups. In a preferred embodiment the flushing system operates to continue or initiate flow of auxiliary fluid material to the flow distributor in the event proper reactor operation, and particularly the flow of a primary or main fluid material (i.e., fluid material to be treated in the reactor) to the flow distributor, is interrupted. Such an interruption can result, for example, from a power outage. By maintaining the auxiliary fluid flow (or influent back pressure) to the flow distributor following such an event, media bed constituents are prevented from backing up into the flow distributor while the media bed settles or while conditions within the reactor otherwise approach equilibrium with conditions in the flow distributor.

In particular, in one embodiment the invention provides a fluid treatment apparatus including a reactor having a reactor tank, a media bed contained in the reactor tank, and a flow distributor for introducing a main fluid flow into the reactor tank. The fluid treatment apparatus also includes means that communicate with the flow distributor for supplying the main fluid flow to the flow distributor. In the event the main fluid flow is interrupted the media bed will defluidize. The fluid treatment apparatus is therefore provided with means communicating with the flow distributor for preventing the media bed from backing up into the flow distributor in the event of such an interruption. In a preferred embodiment the means for preventing the media bed from backing up into the flow distributor includes an alternate supply of fluid to automatically flush the flow distributor until the media bed settles.

The invention also provides a fluid treatment apparatus including a fluid bed reactor including a reactor tank, a media bed contained in the reactor tank, and a flow distributor extending into the reactor tank. A main fluid supply system including a line communicating with the flow distributor and a pump is provided to supply untreated fluid to the flow distributor for introduction into the reactor tank. In anticipation of a possible interruption in the flow of untreated fluid to the reactor, such as could result from a power loss to the pump, means are provided for supplying an auxiliary or flushing fluid to the flow distributor to prevent the media bed from backing up into the flow distributor. In preferred embodiments the means for supplying the auxiliary fluid includes an auxiliary fluid source and a mechanism that is operable independently of the general power source used by the treatment apparatus to flush the auxiliary fluid through the flow distributor.

When employed in a fluid bed reactor the auxiliary fluid flow alone is preferably insufficient to significantly reduce the settling time of the media bed or provide any appreciable media bed fluidization. It is, however, important that the auxiliary fluid flow to the flow distributor be sufficient to prevent the entry of the media bed into the flow distributor as the media bed settles from a fluidized state. The auxiliary fluid flow is preferably maintained for at least as long as is necessary for conditions within the reactor to reach a quiescent state.

Other features and advantages of the invention will become apparent to those skilled in the art upon review of the following detailed description, claims and drawings.

BRIEF DESCRIPTION OF THE DRAWINGS

FIG. 1 is a partially schematic side elevational view, partially in section, of a fluid treatment apparatus including a backflow prevention system embodying the invention.

FIG. 2 is a view similar to FIG. 1 and shows a portion of an alternative fluid treatment apparatus including a backflow prevention system in accordance with a second embodiment of the invention.

Figure 3:
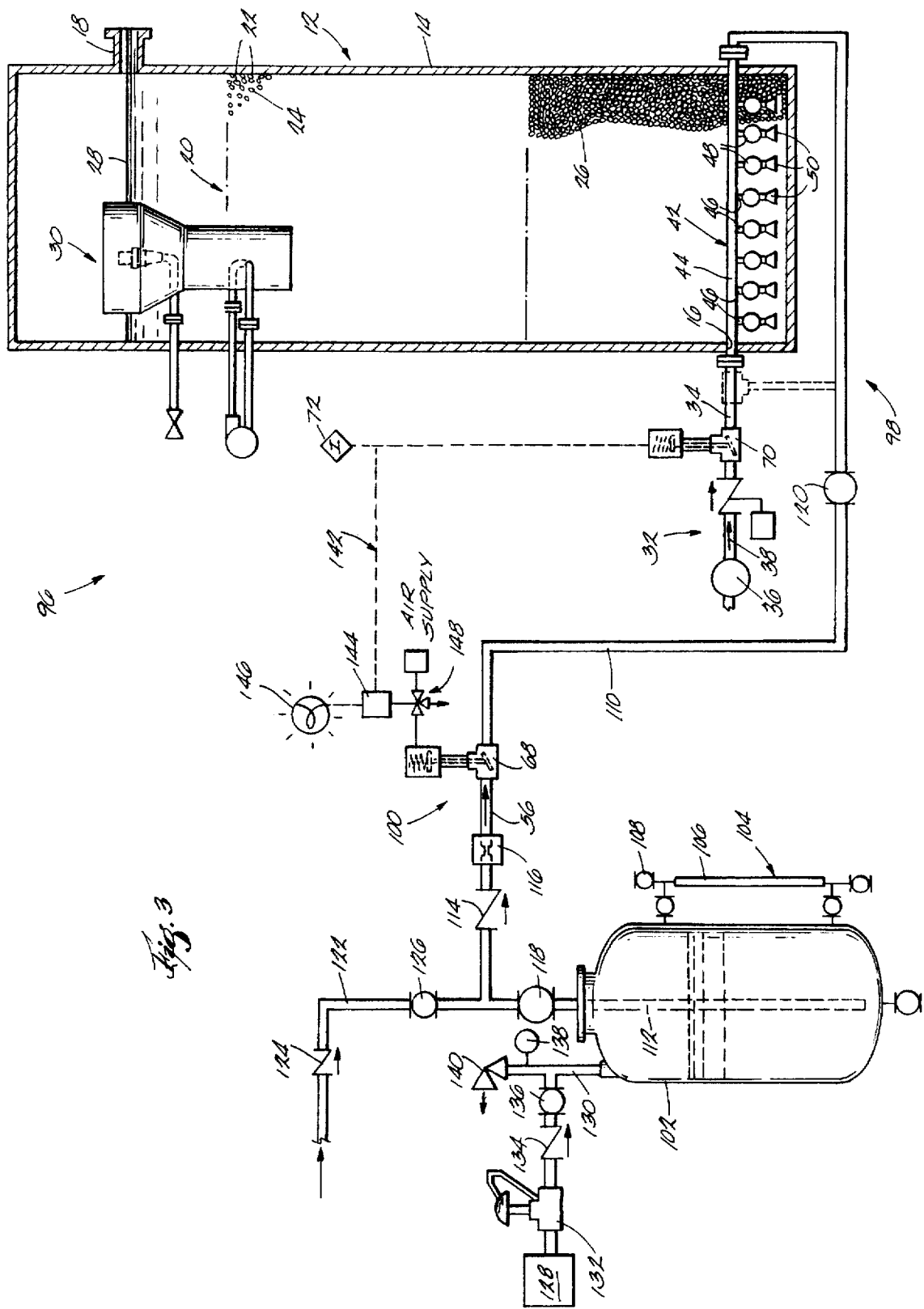
FIG. 3 is a view similar to FIG. 1 and shows a another alternative fluid treatment apparatus including a backflow prevention system in accordance with a third embodiment of the invention.

Before embodiments of the invention are explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a fluid treatment apparatus 10 which embodies the invention and which includes a filter bed or media bed reactor apparatus. While the reactor apparatus can be configured and operated in various ways (such as in fixed or fluid bed modes for example) as determined appropriate for the particular fluid to be treated and the particular processing objectives, in the embodiment illustrated in FIG. 1 the reactor apparatus is a fluid bed reactor 12.

As shown in FIG. 1, the fluid bed reactor 12 includes a columnar reactor tank 14 having an inlet 16 adjacent its base and an outlet 18 adjacent its top. The reactor tank 14 contains a media bed 20 comprised of particulate solids 22. As is further explained below, when the fluid bed reactor 12 is operational the media bed 20 is fluidized as indicated by reference numeral 24. When the fluid bed reactor 12 is not in operation, the media bed 20 settles to the bottom of the reactor tank 14 as indicated by reference numeral 26.

It will be understood by those skilled in the art that the fluid bed reactor 12 can be employed in numerous applications to perform various different processes on different flowable materials including, for example, various liquids, gases and liquid/solid suspensions. In the particular embodiment illustrated in FIG. 1, the fluid treatment apparatus 10 is used in a waste water treatment facility to process waste water, and the fluid bed reactor 12 is operable biologically to remove impurities from the waste water passed therethrough. Thus, in the particular arrangement illustrated in the drawings the particulate material making up the media bed 20 is preferably granular activated carbon or sand and biomass is carried on the particulate solids. Under aerobic conditions, the biomass consumes impurities in the waste water passed through the media bed 20 to produce a treated effluent (i.e., treated waste water) that forms an effluent head 28 above the media bed 20. The treated effluent is then withdrawn from the reactor tank 14 through the outlet 18 which in the illustrated arrangement controls the level of the effluent head 28.

One of the byproducts of the biological treatment process is biological growth within the media bed 20 which causes the media bed 20 to expand. To control media bed expansion, the fluid bed reactor 12 is provided with a bed growth control apparatus 30. The structure and operation of the bed growth control apparatus 30 is fully explained in U.S. patent application Ser. No. 195,397, filed Feb. 14, 1994, and titled BIOMASS GROWTH CONTROL APPARATUS FOR FLUID BED BIOLOGICAL REACTOR, which is herein incorporated by reference. The bed growth control apparatus 30 will not be further discussed. Other suitable bed growth control apparatus are disclosed in U.S. Pat. Nos. 4,250,033 and 4,177,144.

To supply influent requiring processing to the fluid bed reactor 12, the fluid treatment apparatus 10 is provided with a main fluid supply system 32. The main fluid supply system 32 includes a fluid supply conduit or main line 34 and a pump 36 or other suitable means for pumping a main fluid 38 (i.e., untreated waste water) from a remote source (not shown) to the fluid bed reactor 12.

To receive influent (including main fluid 38) and to introduce that influent into the reactor tank 14, the fluid bed reactor 12 includes a flow distribution system 40. As shown in FIG. 1, the flow distribution system 40 includes a flow distributor 42 positioned adjacent the base of the reactor tank 14. The flow distributor 42 includes a tubular header member 44 that extends through the inlet 16 of the reactor tank 14 and that is connected to the main line 34. The header member 44 is manifolded to a plurality of downcomer pipes 46 that are connected to laterally extending pipes 48. The lateral pipes 48 are studded with downwardly extending nozzles 50 for delivering the influent into the reactor tank 14. The array of nozzles 50 is preferably spread over the bottom of the reactor tank 14 so that the influent is evenly distributed over the cross-sectional area of the reactor tank 14 to achieve a substantially uniform upflow therein.

In the event the flow of main fluid 38 to the reactor tank 14 is interrupted so that the media bed 20 is unable to maintain its fluidized state, the media bed 20 will begin to settle to the bottom of the reactor tank 14 and will continue until sufficient influent flow to fluidize the media bed 20 is restored. To prevent media bed constituents from entering the flow distributor 42 as the media bed 20 settles, the flow distribution system 40 is provided with a backflow prevention system 54 for preventing the media bed 24 from backing up into the flow distributor 34 following interruption of the flow of main fluid 38. As explained further below, the backflow prevention system 54 is operable to flush the flow distributor 42 following a shut-down of the liquid treatment apparatus 10.

The backflow prevention system 54 includes means for supplying an auxiliary fluid 56 to the flow distributor 42 to maintain some influent flow through (or back pressure in) the flow distributor 42. In the embodiment illustrated in FIG. 1, the means for supplying the auxiliary fluid 56 to the flow distributor 42 includes an auxiliary fluid supply conduit or auxiliary line 58 provided with a one-way check valve 60 and a manually operable valve 62. The auxiliary line 58 is connected between the main line 34 and an auxiliary fluid source 64 which in the illustrated arrangement is a municipal water supply.

While the auxiliary line 58 can remain open at all times, in the illustrated arrangement the backflow prevention system 54 is provided with actuating means for controlling the flow of auxiliary fluid 56 to the flow distributor 42. The actuating means is operable to initiate flow of auxiliary fluid 56 to the flow distributor 42 in response to the loss of power to the liquid treatment system 10 and includes a shutdown interlock assembly 66. The shutdown interlock assembly 66 includes a solenoid actuated fail-open valve 68 in the auxiliary line 58 and a solenoid actuated fail-close valve 70 in the main line 34. The fail-open valve 68 and the fail-close valve 70 are electrically interlocked and operate in response to a signal generated by an interlock (ISA standard) or a power loss indicator 72 that detects power loss to a motor (not shown) used to drive the pump 36.

Under normal operating conditions valve 62 is open, the fail-open valve 68 is closed, the fail-close valve 70 is open, and the pump 36 is powered to provide main fluid 38 to the reactor tank 14. The flow rate of the main fluid 38 supplied to the reactor tank 14 is controlled to insure an upflow velocity within the reactor tank 22 sufficient to maintain the media bed 20 in its fluidized state 24. In the event power to the motor for the pump 36 is lost for some reason, the flow of main fluid 38 to the flow distributor 42 will diminish and the media bed 20 will begin to defluidize. The power loss also activates the indicator 72 of the shutdown interlock assembly 66 to automatically close the fail-close valve 70 and open the fail-open valve 68 to initiate the flow of auxiliary fluid 56 from the municipal water supply 64. As the media bed 20 settles the auxiliary fluid 56 flushes the flow distributor 42 to prevent media bed constituents from backing up into the nozzles 50. Unless power to the pump 36 is sooner restored, it is preferred that flushing with the auxiliary fluid 56 continue until the media bed 20 fully settles to its quiescent state 26. If desired, the auxiliary line 58 can then be closed via valve 62, and the fail-open and fail-close valves 68 and 70 reset to prepare the shutdown interlock assembly 66 for when the pump 36 is placed back in service.

Illustrated in FIG. 2 is a fluid treatment apparatus 74 that employs an alternative flow distribution system 76 that includes flow distributer 42 and a backflow prevention system 78 in accordance with a second embodiment of the invention. Otherwise, fluid treatment apparatus 74 is similar to fluid treatment apparatus 10 (FIG. 1) and the same reference numerals are used to denote elements common to both.

In backflow prevention system 78, the means for supplying auxiliary fluid 56 to the flow distributor 42 includes an auxiliary line 80 provided with an anti-backflow pump 82 having its own uninterrupted power source, such as a DC battery 84. The auxiliary line 80 is also provided with a one-way check valve 86, a manually operable valve 88, and a rotometer 90 of suitable design to measure the flow rate, if any, through the auxiliary line 80. The auxiliary line 80 is connected between the main line 34 and a liquid storage tank 92 which acts as an auxiliary fluid source.

The backflow prevention apparatus 74 also includes a modified shutdown interlock assembly 94. The shutdown interlock assembly 94 includes the fail-open and fail close valves 68 and 70 discussed above with respect to shutdown interlock assembly 66, and is also operable to interconnect the anti-backflow pump 82 and the DC battery 84 to activate the pump 82.

During operation of liquid treatment apparatus 74, main fluid 38 (i.e., waste water) is pumped to the flow distributor 42 for introduction into the reactor tank 14 where it is treated as it ascends upwardly through the media bed 20. If power is lost to the main pump 36, the shutdown interlock assembly 94 signals the fail-open valve 68 to open the auxiliary line 80 and the fail-close valve 70 to close the main line 34. The shutdown interlock assembly 94 also activates operation of the anti-backflow pump 82 to pump auxiliary fluid 56 from the storage tank 92 to the flow distributor 42. The auxiliary fluid 56 flushes the flow distributor 42 as the media bed 20 settles to prevent media bed constituents from backing up into the flow distributor 42.

Prior to starting fluid bed reactor 12 again, the fail-open and fail-close valves 68 and 70 are reset, the anti-backflow pump 82 is disconnected from the DC battery 84, and the battery 84 recharged so that it is ready in the event power to the fluid treatment apparatus 74 is again lost. While backflow prevention system 54 (FIG. 1) has a simpler construction than backflow prevention system 78 (FIG. 2), backflow prevention system 78 has the advantage of being usable where a municipal water supply or other ready supply of auxiliary fluid 56 is unavailable.

Illustrated in FIG. 3 is a fluid treatment apparatus 96 that employs a second alternative flow distribution system 98. The flow distribution system 98 includes flow distributer 42 and a backflow prevention system 100 in accordance with a third embodiment of the invention. Fluid treatment apparatus 96 is otherwise similar to fluid treatment apparatus 10 and 74 of FIGS. 1 and 2, respectively, and like reference numerals denote elements common to all.

In backflow prevention system 100 the means for supplying auxiliary fluid 56 to the flow distributor 42 includes an auxiliary fluid source which in the illustrated arrangement is storage tank 102. The storage tank 102 is preferably an ASME (Section VIII code) pressure vessel rated at 100 psig and having a capacity to hold in excess of 1000 gallons of auxiliary fluid 56. If desired, the storage tank 102 can be internally coated so that potentially corrosive auxiliary fluids, such as sea water for example, can be used. To monitor fluid level, the storage tank 102 is provided with a level gauge 104 including a site tube 106 and an associated valve arrangement including a vent valve 108.

To provide communication between the storage tank 102 and the flow distributor 42 an auxiliary line 110 is provided. One end of the auxiliary line 110 is connected directly to the header member 44 which has been modified for that purpose. Alternatively, the auxiliary line 110 could be connected to the main line 34 (as indicated in broken lines in FIG. 3). The opposite end of the auxiliary line 110 is connected to the storage tank 102 and includes an extension 112 that extends downwardly into the storage tank 102. The auxiliary line 110 is also provided with a one-way check valve 114, a constriction orifice 116, and a pair of manually operable valves 118 and 120.

Means are provided for charging the storage tank 102 with auxiliary fluid 56. In the illustrated arrangement the means for charging the storage tank 102 includes a fluid supply line 122 connected between a remote fluid source (not shown) and the auxiliary line 110. A one-way check valve 124 and a manually operable tank fill valve 126 are provided to control fluid flow to the storage tank 102.

The backflow prevention apparatus 100 also includes alternative means for pumping or delivering the auxiliary fluid 56 from the storage tank 102 to the flow distributer 42 to replace the anti-backflow pump 82 and battery 84 used in the embodiment of FIG. 2. As shown in FIG. 3, the alternative pumping means includes a pressurized air source 128 and an air line 130 connected between the air source 128 and the storage tank 102. The air line 130 is provided with a pressure regulator 132, a one-way check valve 134, and a manually operable air valve 136. The air line 130 is also provided with a pressure gauge 138 and a pressure release mechanism 140.

The backflow prevention apparatus 100 also includes a modified shutdown interlock assembly 142 for activating the backflow prevention apparatus 100. In addition to the fail-open and fail-close valves 68 and 70, the shutdown interlock assembly 142 includes a hand switch 144 and associated display light 146 and a conventional arrangement 148 that acts as a pilot or control valve for the fail-open valve 68. The arrangement 148 communicates with a pressurized air source, such as air source 128, and is used to Prior e the position of the fail-open valve 68.

Prior to start-up of fluid treatment apparatus 96 the storage tank 102 is empty, the fail-open valve 68 and valves 118 and 120 are open, and the tank fill valve 126, the vent valve 108, and the air valve 136 are all closed. Before starting the fluid bed reactor 12, the fail-open valve 68 is reset by placing the hand switch 144 in a closed position to activate the interlock reset arrangement 148 to close the fail-open valve 68. Next, the vent valve 108 and the fill valve 126 are manually opened and the storage tank 102 is filled to a predetermined level. When the fluid in the storage tank 102 reaches the desired level (i.e., about the 600 gallon level in the illustrated arrangement) the vent valve 108 and the fill valve 126 are manually closed and the air valve 136 is manually opened to pressurize the storage tank 102 to the setting of the regulator 132 (about 60 psig). The air valve 136 is then manually closed and the hand switch 144 for the fail-open valve 68 is placed in an AUTO position. At this point the backflow prevention system 100 is in a state of readiness.

With the backflow prevention system 100 ready the fluid bed reactor 12 is placed in service by turning the main pump 36 on to pump main fluid 38 to the flow distributor 42 for introduction into the reactor tank 14. The fail-closed valve 70 remains open as long as power is supplied to the main pump 36. During fluid bed reactor operation the pressure gauge 138 and the level gauge 104 are periodically checked to confirm the readiness of the backflow prevention system 100.

In the event of a system shut-down (i.e., power outage), the shutdown interlock assembly 142 automatically causes the fail-close valve 70 to close the main line 34 and the fail-open valve 68 to open the auxiliary line 110. Auxiliary fluid 56 from the storage tank 102, under the influence of the pressure within the storage tank 102, then flushes the flow distributor 42 as the media bed defluidizes. The constriction orifice 116 limits the flow rate through the auxiliary line 110 and in the illustrated arrangement that flow rate is limited initially to about 30 gallons per minute. As the media bed 20 settles and the pressure within the storage tank 102 falls, the flow rate through the auxiliary line 110 tapers off to about 10 gallons per minute. When the pressure in the storage tank 102 reaches equilibrium with the static height of the fluid in the reactor tank 14 flow from the storage tank 102 ceases. In the illustrated arrangement the media bed 20 is expected to reach its settled state 26 by that time. After the event, the backflow prevention system 100 is once again readied as described above to prepare the fluid treatment apparatus 96 to be turned on again.

The backflow prevention apparatus 100 (FIG. 3) is advantageous over backflow prevention apparatus 78 (FIG. 2) in that the former does not require the battery 84 (which may take several hours to recharge) or any other uninterrupted power source. The backflow prevention apparatus 100 also provides a higher confidence level since the pressure gauge 138 and level gauge 104 give regular readings to confirm that the system is ready.

Other features and advantages of the invention are set forth in the following claims.

We claim:

1. A method of treating liquid in a treatment apparatus including a reactor tank, a media bed contained in the reactor tank, a flow distributor including an outlet extending into the reactor tank, a supply of waste water to be treated, which waste water supply is exterior to the reactor tank, and a second liquid supply other than the waste water supply, which second liquid supply is exterior to the reactor tank, said method comprising the steps of supplying to the flow distributor upstream of the outlet a flow of the waste water from the waste water supply exterior to the reactor tank so as to flow to the outlet and through the outlet into the reactor tank, thereby introducing the flow of waste water to be treated into the reactor tank, and supplying to the flow distributor upstream of the outlet and from the second liquid supply exterior to the reactor tank a flow of the second liquid so as to flow to the outlet and through the outlet to the reactor tank, thereby introducing the flow of the second liquid into the reactor tank and thereby preventing the media bed from backing up through the outlet into the flow distributor in the event the waste water flow to the flow distributor is interrupted.

2. A method of treating liquid in a treatment apparatus including a reactor tank, a media bed contained in the reactor tank, a flow distributor including an outlet extending into the reactor tank, a supply of waste liquid to be treated, which waste liquid supply is exterior to the reactor tank, and a second liquid supply other than the waste liquid supply, which second liquid supply is exterior to the reactor tank, said method comprising the steps of supplying from the supply of waste liquid a flow of the waste liquid to be treated to the flow distributor upstream of the outlet so as to flow to the outlet and through the outlet into the reactor tank, thereby introducing the flow of waste liquid to be treated into the reactor tank, and preventing the media bed from backing up through the outlet and into the flow distributor by supplying from the second liquid supply a flow of the second liquid into the flow distributor upstream of the outlet so as to flow toward the outlet and through the outlet to the reactor tank.

3. A method of treating liquid in a treatment apparatus including a reactor tank, a media bed contained in the reactor tank, a flow distributor including an outlet extending into the reactor tank, a source of waste liquid to be treated, which waste liquid source is exterior to the reactor tank, and a second liquid source other than the waste liquid source, which second liquid source is exterior to the reactor tank, said method comprising the steps of supplying from the source of waste liquid a flow of waste liquid to be treated to the flow distributor upstream of the outlet so as to flow to the outlet and through the outlet into the reactor tank, thereby introducing the flow of liquid to be treated into the reactor tank, and preventing the media bed from backing up through the outlet and into the flow distributor in the event the flow to the flow distributor of the waste liquid to be treated is interrupted by introducing from the second liquid source a flow of the second liquid into the flow distributor upstream of the outlet so as to flow toward the outlet and through the outlet to the reactor tank.

* * * * *